Figure 2:
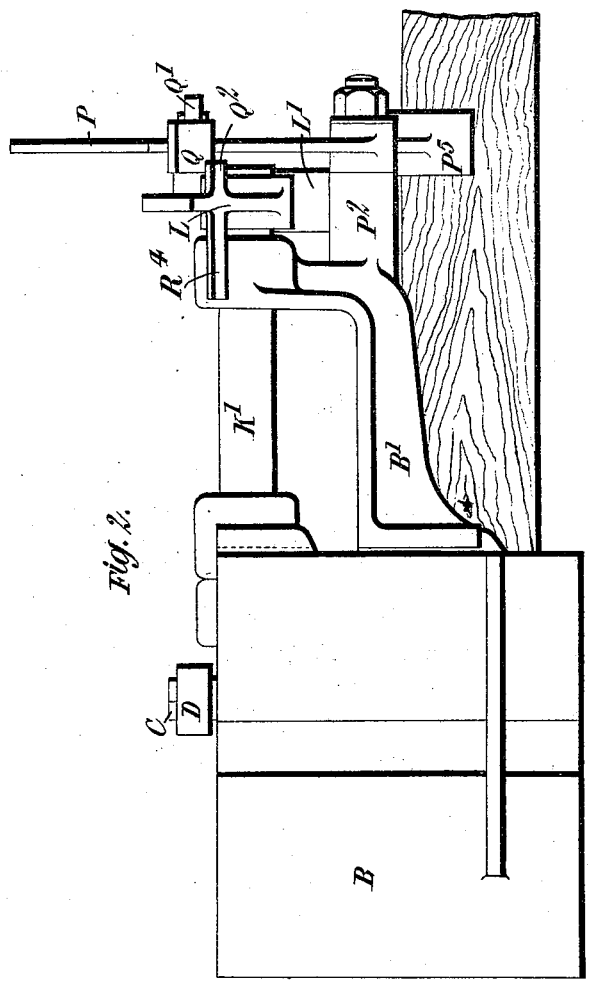

(No Model.)
7 Sheets—Sheet 1.
J. G. DIXON.
FOG SIGNAL APPARATUS FOR RAILWAYS.
No. 520,671.
Patented May 29, 1894.
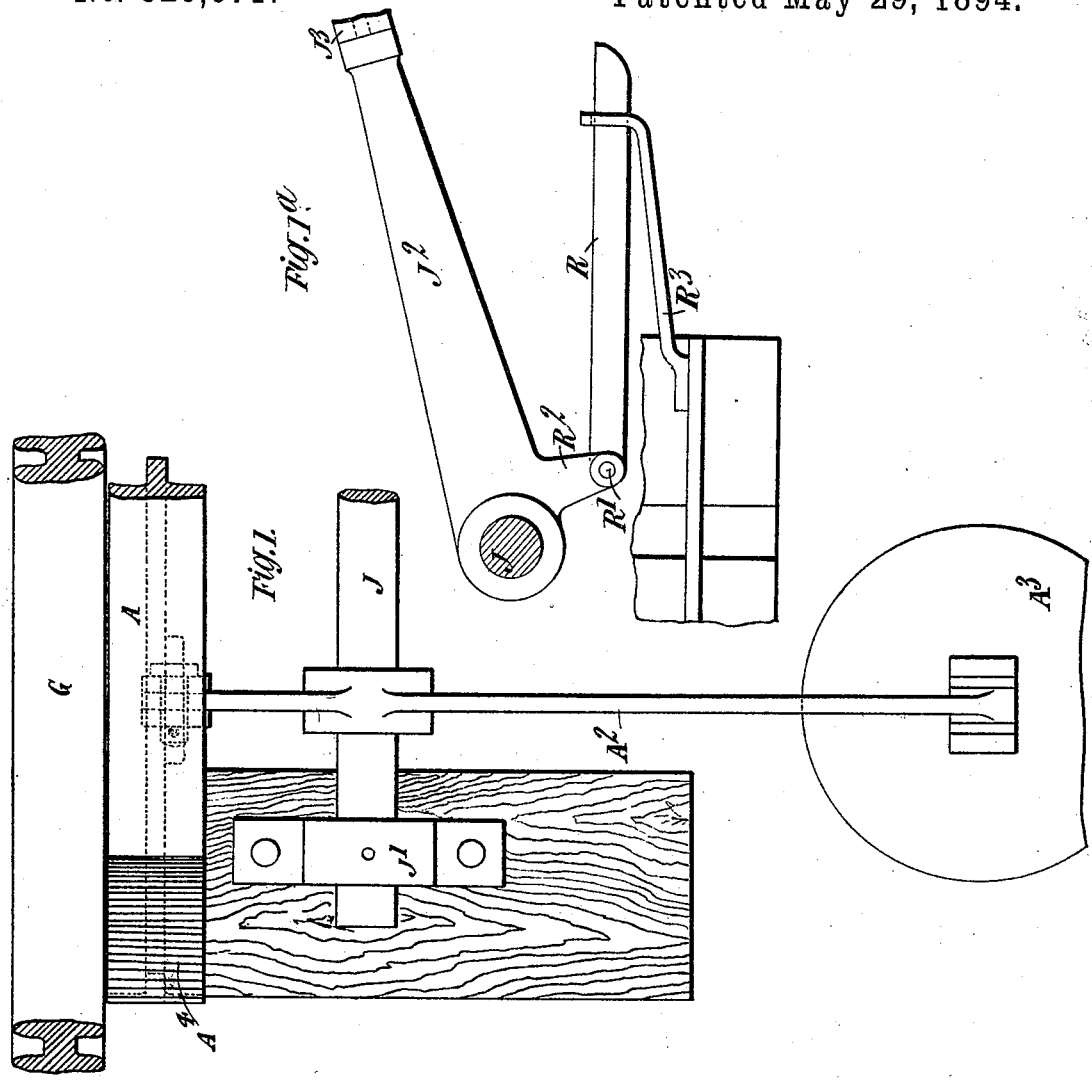
Witnesses:
G. W. Rea
Thos. A. Green
Inventor:
John G. Dixon,
By James L. Norris,
Atty.

(No Model.) 7 Sheets—Sheet 2.
J. G. DIXON.
FOG SIGNAL APPARATUS FOR RAILWAYS.
No. 520,671. Patented May 29, 1894.
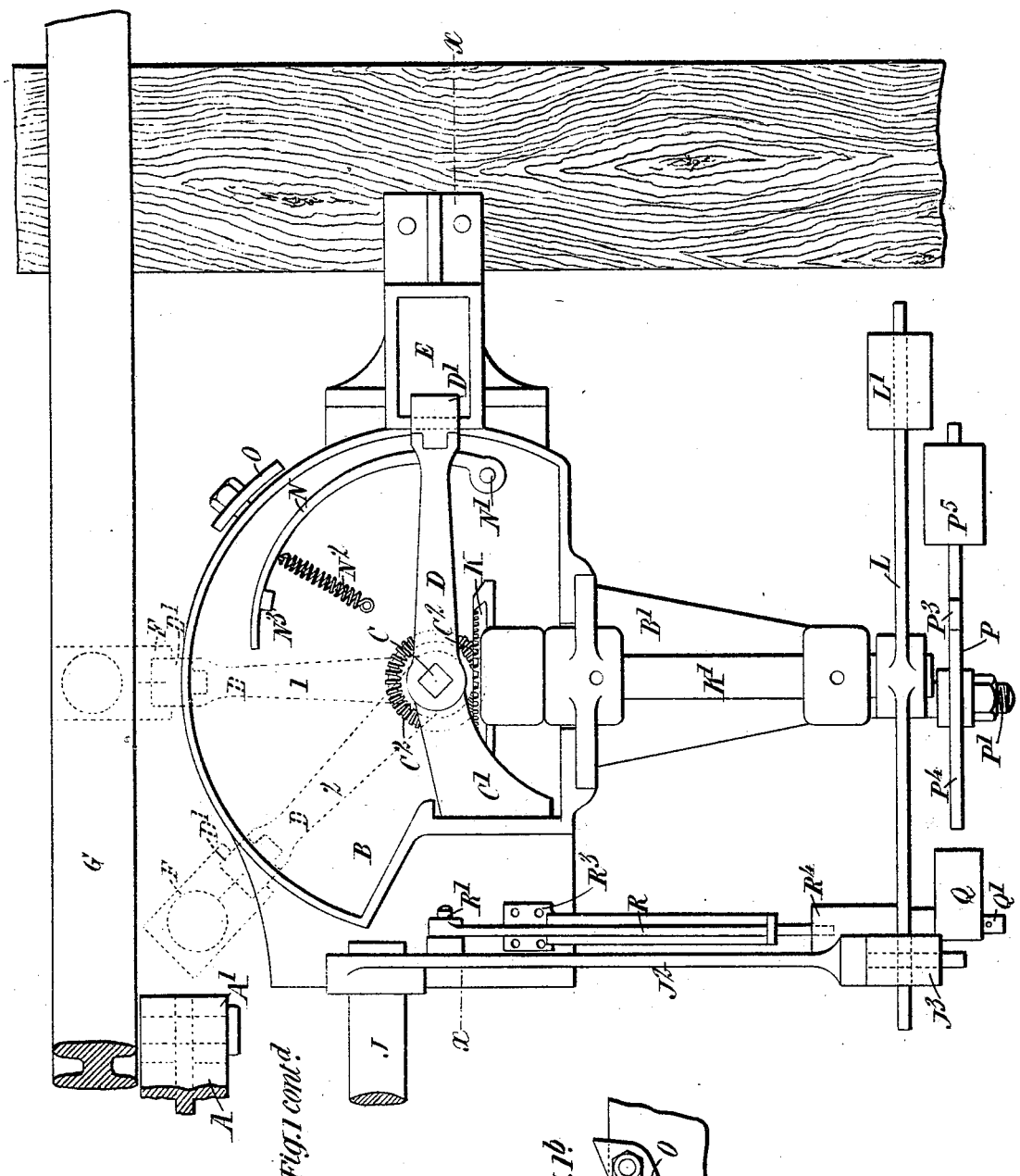
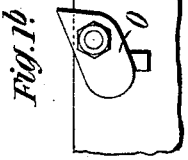
Fig.1 cont'd.
Fig.1b
Witnesses:
G. W. Real
Thos. A. Green
Inventor:
John G. Dixon,
By James L. Norris
Atty (No Model.)  7 Sheets—Sheet 3.

J. G. DIXON.
FOG SIGNAL APPARATUS FOR RAILWAYS.

No. 520,671.  Patented May 29, 1894.

Witnesses:
G. W. Rea,
Thos. A. Green

Inventor:
John G. Dixon,
By James L. Norris.
Atty.

(No Model.)　　　　　J. G. DIXON.　　　7 Sheets—Sheet 4.
FOG SIGNAL APPARATUS FOR RAILWAYS.
No. 520,671.　　　　　Patented May 29, 1894.

Witnesses:
G. W. Rea
Thos. A. Green

Inventor:
John G. Dixon
By James L. Norris.
Atty (No Model.)  7 Sheets—Sheet 5.
J. G. DIXON.
FOG SIGNAL APPARATUS FOR RAILWAYS.

No. 520,671. Patented May 29, 1894.

(No Model.) 7 Sheets—Sheet 6.

J. G. DIXON.
FOG SIGNAL APPARATUS FOR RAILWAYS.

No. 520,671. Patented May 29, 1894.

Witnesses:
G. W. Rea.
Thos. A. Green

Inventor:
John G. Dixon,
By James L. Norris.
Atty.

THE NATIONAL LITHOGRAPHING COMPANY,
WASHINGTON, D. C.

(No Model.) 7 Sheets—Sheet 7.

J. G. DIXON.
FOG SIGNAL APPARATUS FOR RAILWAYS.

No. 520,671. Patented May 29, 1894.

Witnesses:
G. H. Rea,
Thos. A. Green

Inventor:
John G. Dixon,
By James L. Norris
Atty.

THE NATIONAL LITHOGRAPHING COMPANY,
WASHINGTON, D. C.

UNITED STATES PATENT OFFICE.

JOHN GEORGE DIXON, OF HUDDERSFIELD, ENGLAND.

FOG-SIGNAL APPARATUS FOR RAILWAYS.

SPECIFICATION forming part of Letters Patent No. 520,671, dated May 29, 1894.

Application filed January 8, 1894. Serial No. 496,063. (No model.)

*To all whom it may concern:*

Be it known that I, JOHN GEORGE DIXON, spinner's manager, a subject of the Queen of Great Britain, and a resident of Huddersfield, in the county of York, England, have invented certain new and useful Improvements in Fog-Signal Apparatus for Railways, of which the following is a specification, reference being had to the accompanying drawings.

My invention relates to detonating fog-signal apparatus for railways, and has for its objects to provide improved means for placing and retaining the detonator on the metals until the same is exploded by the passing engine or train, and for removing and ejecting the exploded detonator and replacing the same by a fresh detonator to be exploded in its turn.

The apparatus is operated automatically by the passing engine or train. It is moreover connected with the ordinary semaphore signal and thereby controlled in such a manner that a detonator is exploded by a passing engine or train only in case the semaphore signal is "on" that is to say, no explosion occurs when the said signal is "off."

My present invention is intended to effect the same objects as the invention described in the specification of prior Letters Patent granted to me, No. 509,796, dated November 28, 1893, but with less costly apparatus. As in said apparatus I use by the side of the rail an inclined bar which is depressed by the wheels of each passing engine or train, in combination with a dash-pot or equivalent device for preventing the too sudden return of the said inclined bar after each depression thereof; and I also avoid a direct connection between the feeding arm that places the detonators on the rail, and the aforesaid inclined bar, whereby the shocks received by the inclined bar are not transmitted to the feeding arm. These form two cardinal features of my aforesaid prior patent and are retained in the present invention.

According to my said invention I provide, for successively placing the detonators on the rail as required, an arm adapted to turn about a vertical or nearly vertical axis, said arm being connected by gearing to a shaft which is controlled by a counterweight and is adapted to be operated by the inclined bar in such a manner that the said feeding arm is caused to turn through a quarter of a revolution more or less in one direction when the inclined bar is depressed, and to return to its initial position when the said bar is raised again. In one position of rest corresponding with the raised position of the inclined bar, the said arm is closely adjacent to the rail and holds the detonator thereon, and in the other position of rest it is opposite a magazine containing a supply of detonators. The arm is fitted with a jaw or clip so arranged in combination with a controlling cam or like device that the same is opened automatically as the arm is swung round away from the rail and is then closed and maintained closed while the arm is swung back toward the rail. The magazine is furnished with an opening through which the detonators are drawn one at a time by said jaw or clip. The feeding arm is also controllable by the ordinary semaphore signal apparatus so as to be withdrawn from the line when the semaphore is pulled "off." A locking device is provided to prevent the return of the feeding arm to the rail, in case the signalman prematurely puts the semaphore signal "on," until the train has cleared the inclined bar.

Figure 3:
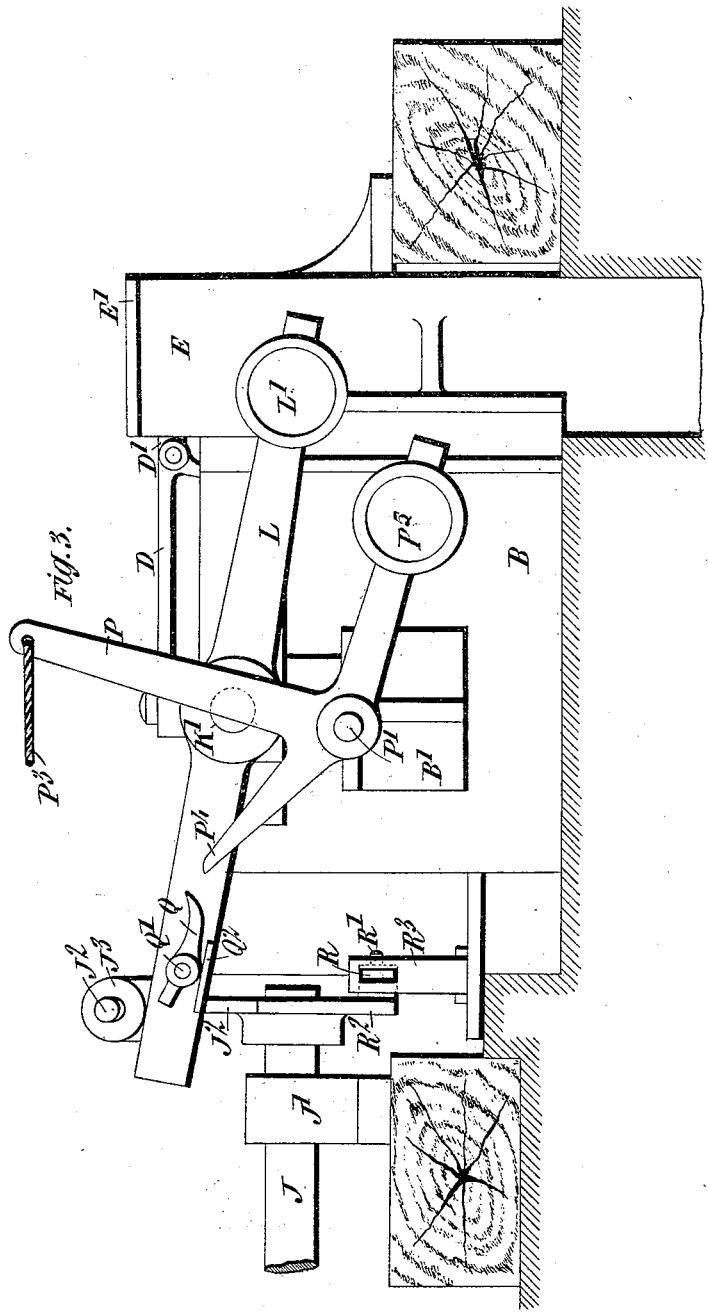
Figure 4:
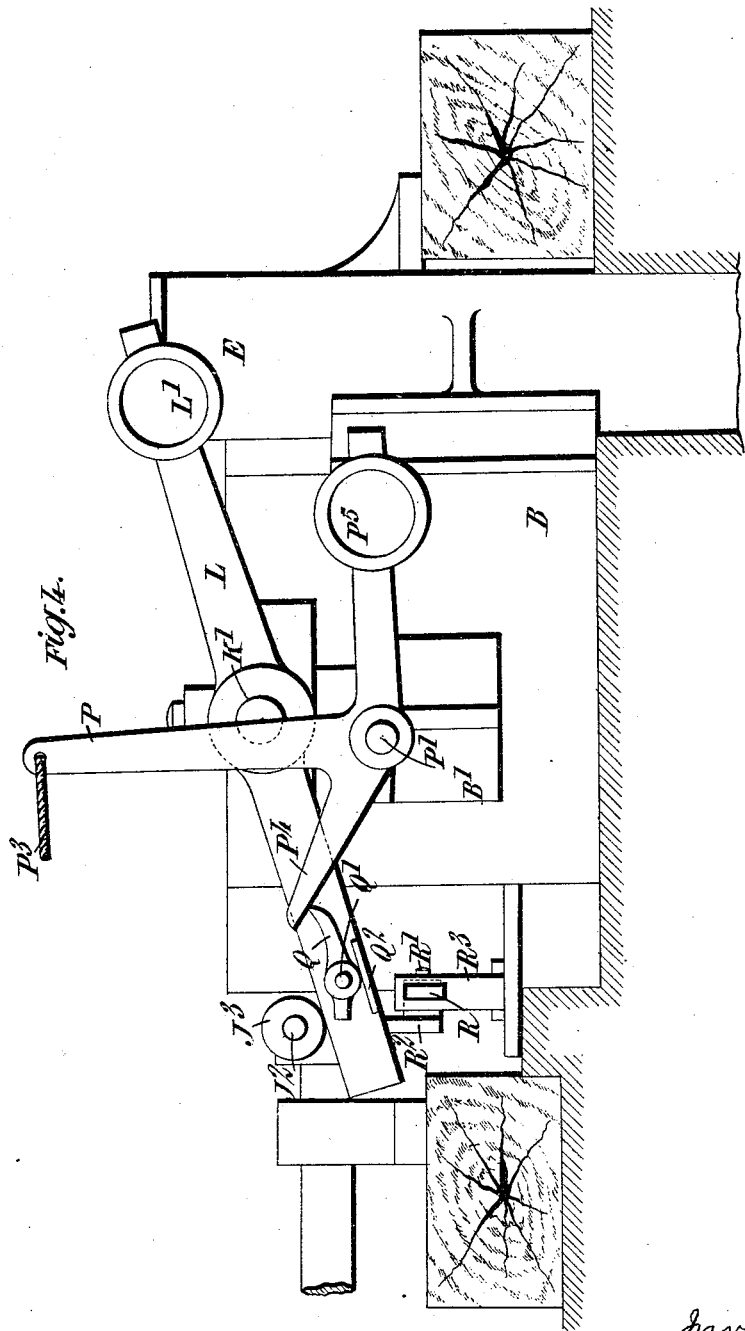
Figure 5:
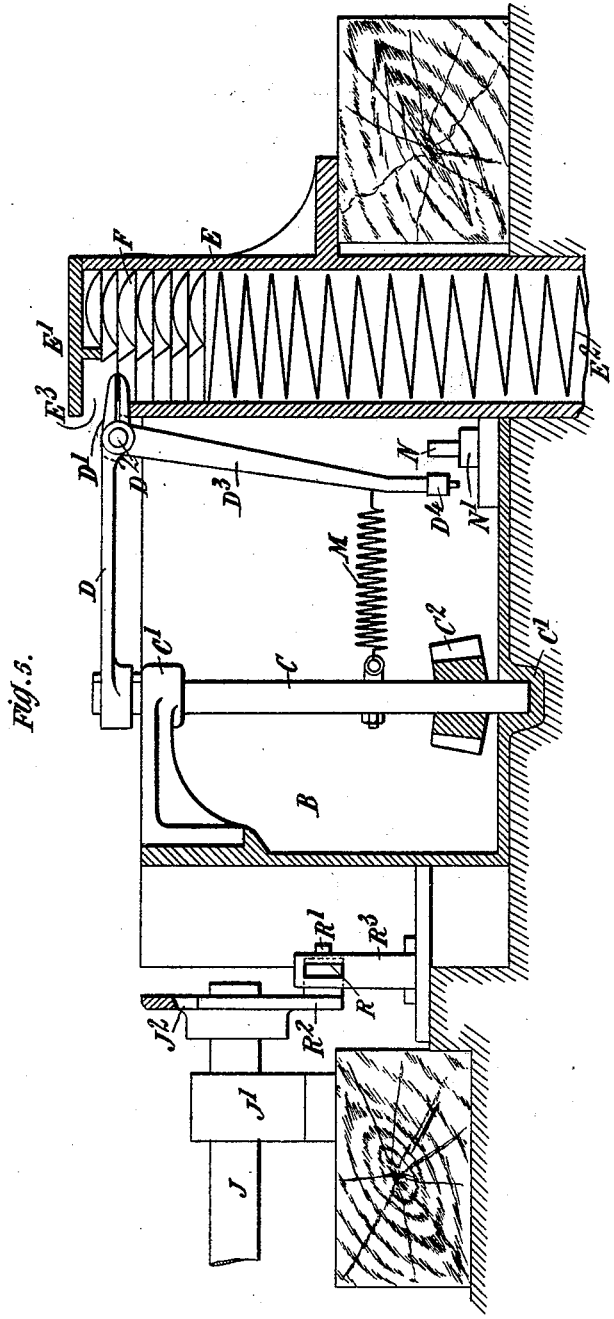
Figure 6:
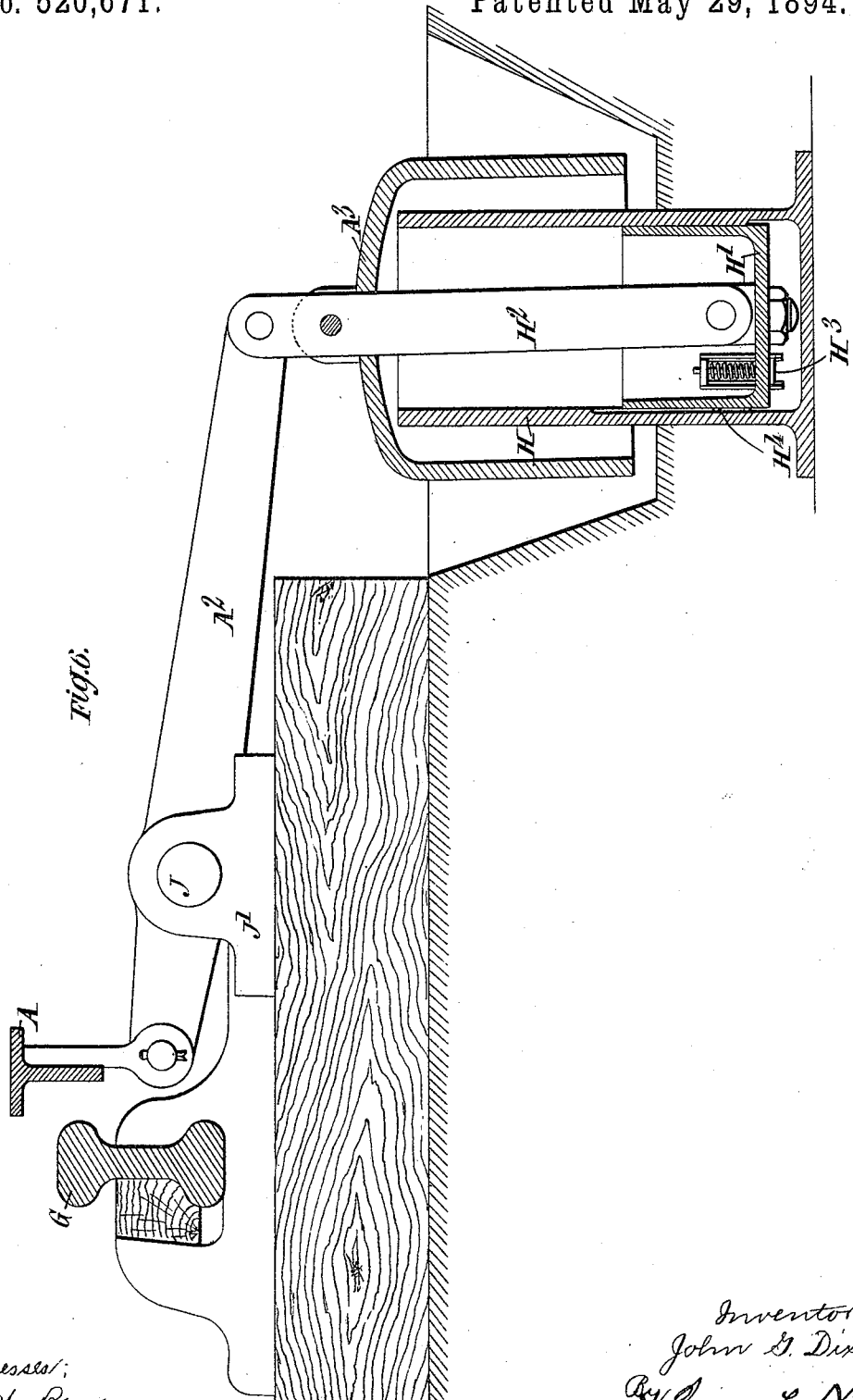

In the accompanying drawings, Figure 1 is a plan partly broken away in the center of my improved apparatus showing the feeding arm in full lines opposite the magazine, and in dotted lines in two other positions, viz. position (1) when holding the detonator on the rail, and position (2) when it has been pulled off by the signalman. Fig. 1ª is a side view of a lever, and Fig. 1ᵇ is a side view of a catch hereinafter described. Fig. 2 is a side elevation of the feeding apparatus and connected parts. Fig. 3 is a front elevation of the same, the levers being in the position they assume when the inclined bar is depressed. Fig. 4 is a similar elevation indicating the normal position when the detonator is held on the line, and showing the signalman's pulling-off lever in engagement with the feed controlling lever ready for pulling the detonator off the line when required. Fig. 5 is a vertical section on the line $x, x$ Fig. 1. Fig.

6 is a side elevation of the mechanism for controlling the inclined bar, the dash-pot hereinafter described being shown in section.

Like letters of reference denote corresponding parts in all the figures.

A is the inclined bar preferably of T-section as shown.

B is a box supporting in suitable bearings C' an upright shaft C to which the feeding arm D is attached.

E is the magazine containing the supply of detonators F which are pressed upward against the cover E' of the magazine by a spring $E^2$. Said magazine may be made to contain say fifty or other suitable number of detonators which are inserted one at a time through a slit $E^3$ in the side of the magazine near the top.

The inclined bar A is placed close to the rail G and is pivoted at A' to a suitable bracket carried for example by one of the sleepers. The top of the bar at its pivoted end is just level with or is a little below the top of the rail. The other end of said bar is supported at a height of about one and one-half inches more or less above the rail by a lever $A^2$ which is keyed on a shaft J and loaded at its outer end by a balance weight $A^3$. The shaft J is supported in bearings J'.

H is a dash-pot or air-cylinder containing a more or less closely fitting piston H' which is coupled by a link $H^2$ to the end of the lever $A^2$ and moves up and down with said lever.

$H^3$ is a valve in the piston opening inwardly to allow the piston to rise freely while serving to check its descent.

$H^4$ is a vertical groove formed in the wall of the air-cylinder H and extending to a level a little higher than the top of the piston when the latter is in its lowest position. The object of this groove is to release the air before the piston has completed its descent to allow the latter part of the descent to be made rapidly.

It will be obvious that when a train passes along the metals, the bar A will be depressed and the balance weight $A^3$ and piston H' thereby raised. As soon as the train has passed, the balance weight $A^3$ causes the bar A to rise again, but the action is slow, being determined by the rate at which the air can leak past the piston H'. As soon however as the upper end of the groove $H^4$ is uncovered, the remaining portion of the descent of the balance weight and piston is performed rapidly. Since the first part of the descent of the balance weight is slow, the bar A has not time to rise but very little until the whole train has completely passed over the bar. The balance weight $A^3$ is made bell-shaped and incloses the air-cylinder as shown, to keep out dirt and the like. The raised end of the bar A is bent downward as shown at $A^4$ to allow of a train passing over the same in the backward direction.

The oscillating movements of the shaft J caused by the up and down movements of the bar A are utilized to effect the feeding of the detonators as follows, that is to say, on the lower end of the shaft C in the box B is fixed a toothed wheel $C^2$ which gears with a toothed quadrant K. Said quadrant is fixed on the inner end of a shaft K' mounted in suitable bearings in a fixed bracket B'. On the outer end of said shaft K' is fixed a lever L furnished with an adjustable balance weight L' which operates when freed from restraint to turn the arm D to the position for taking up a fresh detonator from the magazine E. The said lever L is controlled by an arm $J^2$ fixed on the end of the shaft J which arm projects over the tail end of the lever L and prevents the latter from rising so long as the said arm $J^2$ is held down by the balance weight $A^3$ which is made sufficiently heavy for the purpose. This position of the lever L corresponds with the feed arm D holding the detonator on the rail. When the inclined bar A is depressed, the arm $J^2$ is forcibly raised, and the lever L is thus freed, whereupon its balance weight L' operates to turn the arm D back to the magazine. When the inclined bar A rises again under the influence of the weight $A^3$, the arm $J^2$ operates to depress the tail end of the lever L and thus turns the arm D to the rail again. A roller $J^3$ is provided on the arm $J^2$ to reduce the friction between the said arm and the lever L.

The arm D is furnished with suitable means for taking hold of the detonators as follows, that is to say, D' is a jaw hinged at $D^2$ to the arm D and having a long downwardly extending tail or arm $D^3$ which is controlled by a spring M the inner end of which is secured to the shaft C. Said jaw D' forms with the lever D a clip. The spring M tends to keep the clip tightly closed. Pivoted at N' to the lower end of the box B is a curved blade N which is controlled by a spring $N^2$ that tends to press the blade against a stop $N^3$. In this position, the blade is eccentric to the shaft C as is clearly seen from Fig. 1. The lower end of the tail or arm $D^3$ carries a roller $D^4$ to reduce friction, which roller when the arm D is opposite the magazine is inside the blade N as shown in Fig. 5. When however the arm D begins to turn, the said roller $D^4$ first touches and then presses outward the blade N until it escapes past the end of the blade just as the arm arrives opposite the rail, whereupon the blade is pulled in again by its spring. The pressure of the roller $D^4$ against the blade N tends to more tightly close the jaw on the detonator. On the return journey of the arm D the roller $D^4$ passes outside the blade N and sliding thereon gradually operates to open the jaw D' thus releasing the detonator and allowing the same to drop out. To insure that the detonator shall be thrown out, a catch O Figs. 1 and $1^b$ is so pivoted to the side of the box B that while allowing the detonator to freely pass over and depress same when traveling toward the rail it will not allow the detonator to pass when the arm is moving away from the rail. The jaw is kept open until the arm arrives opposite the magazine, at which moment the lower end of the arm $D^3$ escapes past the end of the blade N and the jaw is then closed by its spring on the projecting lip of the uppermost detonator in the magazine. The part of the blade N near the hinge is of less height than that which operates on the roller $D^4$ and does not interfere with the escape of the said roller when the arm D arrives opposite the magazine as aforesaid. As each detonator is withdrawn from the magazine, the remaining detonators are pushed up by the spring $E^2$. The detonators are secured by turned up portions of plate on strips of thin tinned plate of Z shape, the tails of which are of convenient length for seizure by the jaw.

The above description applies to cases where detonators are exploded by each passing engine or train, it being understood that the normal position of rest of the arm D is opposite the rail. It is necessary however that the detonator be withdrawable from the rail when the line is clear so as to allow a train to pass in such circumstance without exploding the detonator. For this purpose the apparatus is connected with the ordinary semaphore signal and operated in unison therewith so that the detonator is held on the line in readiness to be exploded when the semaphore signal is "on" and is withdrawn from the line when the semaphore signal is "off." The connection is effected by a pulling-off lever P which is loosely pivoted at $P'$ to a suitable bracket $P^2$ a little below and to one side of the shaft $K'$. Said lever is connected at its upper end by the wire or rod $P^3$ to the wire or rod which controls the semaphore signal, and is provided with an arm or finger $P^4$ and with a balance weight $P^5$ which returns the lever to its normal position shown in Fig. 3 when released by the putting back of the semaphore signal to "danger." On the lever L is pivoted at $Q'$ a catch Q supported by a projection $Q^2$ fixed to the lever, which projection allows the catch to be raised but not depressed. It will be observed that in the position shown in Fig. 3, the lever P can be pulled without its finger $P^4$ engaging the catch Q, but when the lever L is depressed to the danger position shown in Fig. 4 which corresponds with the detonator on the line, and the lever P is then pulled its finger $P^4$ will be found to engage with the catch Q as shown in Fig. 4, and on being pulled right over will cause the lever L to turn still farther and withdraw the detonator from the line to the dotted position (2) shown in Fig. 1. The train can now pass without exploding the detonator. On putting back the semaphore signal to "danger" the lever P is thereby allowed to return to its normal position under the influence of its balance weight $P^5$, and the arm D returns to place the detonator on the line again being there arrested by the arm $J^2$.

In order to prevent the arm D returning to the rail before a train has completely passed, in case the signalman puts his signal back to "danger" prematurely I provide a rod R which is pivoted at $R'$ to a downwardly projecting part $R^2$ of the arm $J^2$, see Fig. $1^a$. Said rod R passes through a guide $R^3$ and is adapted as hereinafter described to engage a projection $R^4$ of the lever L. When the inclined bar A is depressed, and the arm $J^2$ thereby raised, the rod R is by such movement pushed away from the rail toward the lever L. If the tail end of said lever L has been previously depressed by the signalman through the lever P, the end of the rod R when moved as aforesaid passes over the projection $R^4$ on the lever L and locks the latter, thus preventing the rise thereof until the train has passed clear of the inclined bar A. When it has cleared the bar, the latter begins to rise and the rod R is slowly withdrawn from above the projection $R^4$. Immediately the lever L is unlocked it returns to place the detonator on the line again ready for the next train.

The box B may be provided with a cover to keep out snow and rain.

In clear weather when the apparatus is not required to be in use, the balance weight $A^3$ is wedged up permanently, the inclined bar A being thus put out of action.

What I claim is—

1. A fog signal apparatus having a detonator feeding arm which can oscillate between the rail and a magazine, said arm being controlled by balance weights and by an inclined bar adapted to be depressed by the wheels of a passing engine or train, for the purposes specified.

2. A fog-signal apparatus comprising an oscillatory detonator feeding arm controlled by balance weights and by an inclined bar that is not positively connected to the feeding arm, the said bar being adapted to be depressed by the wheels of a passing engine or train, substantially as described.

3. The combination with the oscillatory feeding arm and the inclined bar through which said arm is controlled from the wheels of a passing engine or train, of a weighted lever geared with the said feeding arm and through which it is actuated in one direction, a shaft having an arm adapted to control said weighted lever, a lever through which said shaft is actuated from the inclined bar, and a dash-pot or air cylinder connected to said lever to prevent a too rapid return of the inclined bar after each depression thereof, substantially as described.

4. The combination with the oscillatory feeding arm, an inclined bar adapted to be depressed by the wheels of a passing engine or train, and a lever through which said feeding arm is controlled from said bar, of a dashpot or air cylinder having a vertical internal groove, and a weighted and valved piston suspended from said lever and adapted to have a vertical movement in the said air cylinder, substantially as described.

5. The spring-controlled jaw on the feed arm in combination with the means for opening said jaw during the return movement of the arm to the magazine, substantially as, and for the purposes, specified.

6. The combination with the detonator magazine, the oscillatory feeding arm, and an inclined bar adapted to be depressed by the wheels of a passing engine or train, of counterbalanced levers intermediate said feeding arm and inclined bar, for automatically controlling the movements of the feeding arm, substantially as described.

7. The combination, with the feeding-arm, and the inclined bar arranged and operating as described, of the pulling-off lever connected with the ordinary semaphore signal and so arranged that it will when operated engage the feeding apparatus when the latter is at the danger position, but not at any other time, substantially as, and for the purposes, specified.

8. The combination, with the feeding arm, the inclined bar, and their connected parts, of the locking rod R for locking the feeding arm when the latter has been pulled off, substantially as, and for the purposes, specified.

9. The combination of a detonator magazine, an oscillatory feeding arm, an inclined bar adapted to be depressed by the wheels of a passing engine or train and through which the feeding arm is automatically controlled, a pulling off lever connected with a semaphore signal and adapted to engage the feeding mechanism only when the latter is at the danger position, and means for locking the feeding arm after it has been pulled off, substantially as described.

In testimony whereof I have hereunto set my hand this 19th day of December, 1893.

JOHN GEORGE DIXON.

Witnesses:
 WM. HAMSDEN,
  *Solicitor, Huddersfield.*
 ARTHUR BLACKBURN,
  *His Clerk.*